July 18, 1933.  S. HAMERNICK  1,919,106
PLUMB AND LEVEL
Filed Jan. 25, 1932
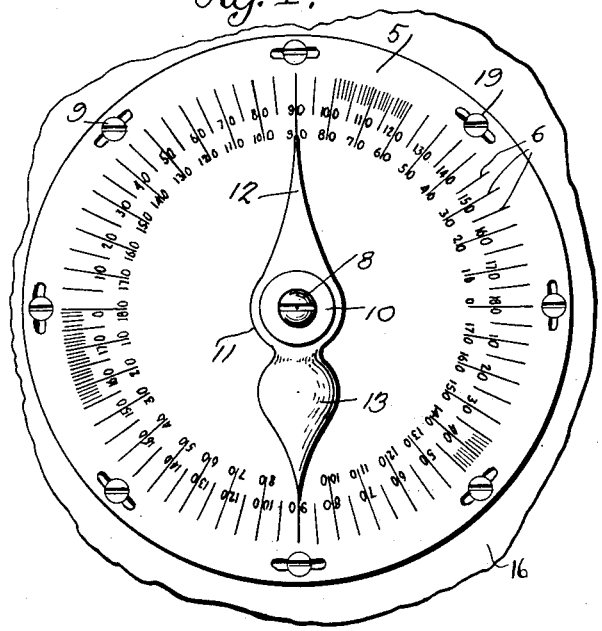
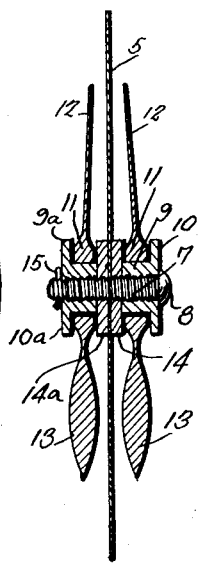
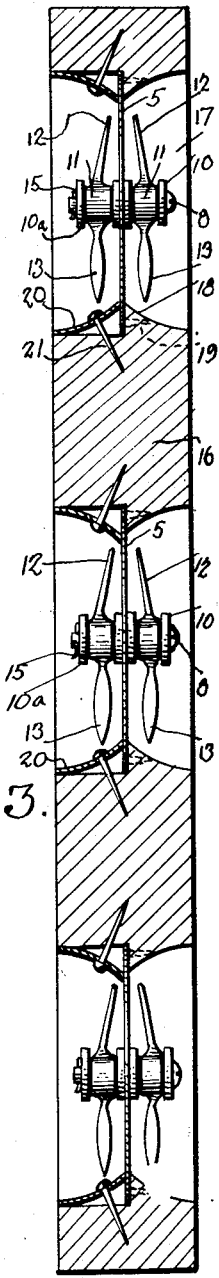
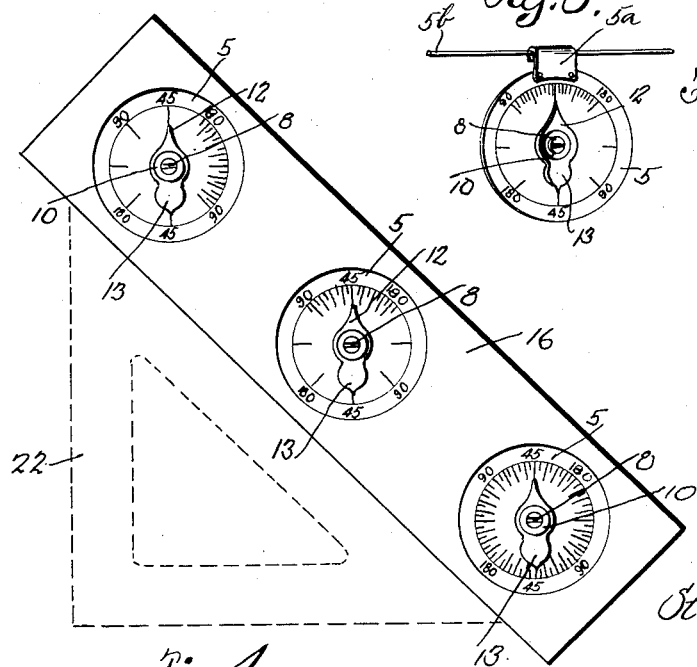
Inventor
Stanley Hamernick
By Bryant & Lowry
Attorneys Patented July 18, 1933

1,919,106

UNITED STATES PATENT OFFICE

STANLEY HAMERNICK, OF MANVILLE, NEW JERSEY

PLUMB AND LEVEL

Application filed January 25, 1932. Serial No. 588,701.

This invention relates to certain new and useful improvements in plumbs and levels.

The primary object of the invention is to provide a plumb and level wherein a combined indicator arm and plumb bob is provided in duplicate, one at each side of a gage or protractor disk set into a cut-out in a level strip or bar and viewable from either side thereof, an important feature of the invention residing in the novel form, or joint or bearing for the combined indicator arms and plumb bobs.

With the above and other objects in view that will become apparent as the nature of the invention is better understood, the same consists in the novel form, combination and arrangement of parts hereinafter more fully described, shown in the accompanying drawing and claimed.

In the drawing:—

Figure 1 is a plan view of the protractor disk detached from the level strip or bar and showing the combined indicator arm and plumb bob supported thereon;

Figure 2 is a vertical cross-sectional view of the protractor disk showing the novel form of joint or bearing for the support of a combined indicator arm and plumb bob at each side of the protractor disk;

Figure 3 is a longitudinal cross-sectional view of the level strip or bar showing a plurality of protractor disks with combined indicator arms and plumb bobs supported therein;

Figure 4 is an elevational view showing the level strip or bar disposed at an angle of 45° relative to a triangular frame illustrated by dotted lines; and Figure 5 is a perspective view showing the protractor used as a line gage.

Referring more in detail to the accompanying drawing, and particularly to Figures 1 and 2, the reference numeral 5 designates the protractor disk having angle degree indicia 6 arranged upon opposite faces thereof in circular series while a combined indicator arm and plumb bob is movable over each side face of the protractor disk 5.

The mounting for the combined indicator arm and plumb bob includes a screw 7 having a head 8 upon one end thereof and upon which screw a bearing member 9 is threaded with an annular flange 10 upon one end movable into abutting engagement with the screw head 8. One of the combined indicator arms and plumb bobs is then mounted in position upon the bearing 9 and includes a hub 11 of less thickness than the length of the hub 9, carrying upon one side thereof an indicator arm 12 and upon its other side a plumb bob 13. A washer 14 is then placed upon the screw 7 in engagement with the adjacent end of the bearing 9 and the protractor disk 5 is then mounted upon the screw 7 to be engaged with the washer 14. A second washer 14a is then placed upon the screw 7 in engagement with the opposite face of the disk 5 and said washer 14a is engaged by the inner end of the second bearing member 9a that has the hub portion 11 of a second combined indicator arm and plumb bob mounted thereon. An annular flange 10a is carried by the outer end of the bearing 9a and after the bearing 9a has been threaded over the screw 7 into binding engagement with the adjacent washer 14a, so that the two washers 14 and 14a and the two bearing members 9 and 9a are rigidly supported on the screw 7, a locking pin or cotter 15 is engaged with the projecting end of the screw 7 for retaining all of said parts in assembled rigid relation with the exception of the hub portions 11 of the two indicator and plumb bob members that are freely rotatable upon the bearings 9 and 9a.

The assembled indicator device is mounted within the level strip or bar 16 and they may be provided in series as indicated in Figures 3 and 4 and to accommodate the mounting of the indicator devices so that they may be viewable from either side of the level strip or bar 16, the latter has openings 17 cut therethrough defining abutment shoulders 18 for the peripheral edges of the protractor disk 5, the latter being retained immovably mounted within the bar openings 17 by screws 19 passing through slotted openings in the peripheral edges of the protractor disks and threaded into the shoulders 18, the opening permitting adjustment of the disks in the bar 16. An annular ring or flange 20 is then placed in that side of the opening 17 which exposes the screws 19 and said ring or flange is retained in position by nails 21 or other fastening devices.

From the above detailed description of the invention, it is believed that the construction and use thereof will at once be apparent, it being noted that the combined indicator arms and plumb bobs are freely supported upon the bearings 9 and 9a as illustrated in Figure 2, and readings upon the protractor disk 5 may be made at either side of the level strip or bar 16. The use of the device is illustrated in Figure 4 as engaged with the angle side of a triangular frame 22 illustrated by dotted lines. The particular bearing for the combined indicator arm and plumb bob permits free pendulous movement of the indicator arm and plumb bob for the correct reading of the protractor indicia upon the disk plate 5. The mounting of the indicator device in the level strip or bar permits reading of the indicator at either side of the bar while the anchoring of the disk plate 5 maintains the same properly positioned relative to the straight edges of the level strip or bar.

As illustrated in Figure 5, a protractor disk 5 has a flat hook 5a attached to a peripheral edge thereof to be mounted on the line 5b for the levelling of the line, the protractor being movable over the line if desired from end to end and presenting readings thereon of the protractor arm under influence of the plumb bob.

While there is herein shown and described the preferred embodiment of the invention, it is nevertheless to be understood that minor changes may be made therein without departing from the spirit and scope of the invention as claimed.

I claim:—

1. In a level and plumb bob, the combination with a straight edge bar having one or more transverse openings therein, of an indicator set into each opening and readable from opposite sides thereof, comprising a protractor disk carrying an axial pin and a combined indicator arm and plumb bob mounted on each end of the pin and movable over the protractor disk, the pin bearing including bearing collars on each end of the pin, each carrying an outer end annular flange, a washer on the pin at each side of the protractor disk and a hub carried by each arm and plumb bob mounted on the bearings between the bearing flange and washer.

2. In a level and plumb bob, the combination with a straight edge bar having one or more transverse openings therein, of an indicator set into each opening and readable from opposite sides thereof, and comprising a protractor disk carrying an axial pin and a combined indicator arm and plumb bob mounted on each end of the pin and movable over the protractor disk, the pin bearing including bearing collars on each end of the pin, each carrying an outer end annular flange, a washer on the pin at each side of the protractor disk and a hub carried by each arm and plumb bob mounted on the bearings between the bearing flange and washer, said pin comprising a screw with the flanged bearings threaded thereon.

3. In a level and plumb bob, the combination with a straight edge bar having one or more transverse openings therein, of an indicator set into each opening and readable from opposite sides thereof, comprising a protractor disk carrying an axial pin and a combined indicator arm and plumb bob mounted on each end of the pin and movable over the protractor disk, the pin bearing including bearing collars on each end of the pin, each carrying an outer end annular flange, a washer on the pin at each side of the protractor disk and a hub carried by each arm and plumb bob mounted on the bearings between the bearing flange and washer, an annular abutment shoulder in each bar opening, the protractor disks being anchored to the shoulders and a ring member secured in one side of the opening and overlying the disk anchor means.

4. In a level and plumb bob, the combination with a straight edge bar having one or more transverse openings therein, of an indicator set into each opening and readable from opposite sides thereof, and comprising a protractor disk carrying an axial pin and a combined indicator arm and plumb bob mounted on each end of the pin and movable over the protractor disk, the pin bearing including bearing collars on each end of the pin, each carrying an outer end annular flange, a washer on the pin at each side of the protractor disk and a hub carried by each arm and plumb bob mounted on the bearings between the bearing flange and washer, said pin comprising a screw with the flanged bearings threaded thereon, an annular abutment shoulder in each bar opening, the protractor disks being anchored to the shoulders and a ring member secured in one side of the opening and overlying the disk anchor means.

5. A level indicator including a protractor disk carrying angle indicia on opposite faces, a screw extending centrally through the disk and projecting at opposite sides, a bearing threaded on each end of the screw and each bearing having an outer end flange, a washer on the screw at each side of the disk and respectively engaged with the inner ends of the bearings, a head at one end of the screw and a cross pin at the other end for retaining the bearings thereon and a combined indicator arm and plumb bob having a hub rotatably supported on each bearing.

6. A level indicator including a protractor disk carrying angle indicia on opposite faces, a screw extending centrally through the disk and projecting at opposite sides, a bearing threaded on each end of the screw and each bearing having an outer end flange, a washer on the screw at each side of the disk and respectively engaged with the inner ends of the bearings, a head at one end of the screw and a cross pin at the other end for retaining the bearings thereon and a combined indicator arm and plumb bob having a hub rotatably supported on each bearing between an end flange and washer and a line wire hook on the peripheral edge of the protractor disk for suspending the level indicator on a wire.

STANLEY HAMERNICK.